(12) United States Patent
Becene et al.

(10) Patent No.: US 11,988,458 B2
(45) Date of Patent: May 21, 2024

(54) MINIMAL SURFACE CORE HEAT EXCHANGERS WITH THREE-DIMENSIONAL PARAMETRIC CONTROL

(71) Applicant: Hamilton Sundstrand Corporation, Charlotte, NC (US)

(72) Inventors: Ahmet T. Becene, West Simsbury, CT (US); Gabriel Ruiz, Broad Brook, CT (US); Feng Feng, South Windsor, CT (US); James Streeter, Torrington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 38 days.

(21) Appl. No.: 17/705,826

(22) Filed: Mar. 28, 2022

(65) Prior Publication Data
US 2023/0304743 A1  Sep. 28, 2023

(51) Int. Cl.
*F28D 7/16* (2006.01)
*B21D 53/06* (2006.01)

(52) U.S. Cl.
CPC ............ *F28D 7/16* (2013.01); *B21D 53/06* (2013.01)

(58) Field of Classification Search
CPC ............ F28D 7/16; F28D 7/163; B21D 53/06
USPC ........................................................... 165/82
See application file for complete search history.

(56) References Cited

U.S. PATENT DOCUMENTS

| | | | |
|---|---|---|---|
| 9,440,216 B2 * | 9/2016 | Ryan | B01J 19/30 |
| 10,107,555 B1 * | 10/2018 | Miller | B23P 15/26 |
| 10,704,841 B2 | 7/2020 | Manzo | |
| 10,948,237 B2 | 3/2021 | Wiedenhoefer | |
| 11,389,765 B2 * | 7/2022 | Roy | B01D 67/0041 |
| 2020/0033070 A1 | 1/2020 | Vlahinos et al. | |
| 2020/0215480 A1 | 7/2020 | Roy et al. | |
| 2020/0309469 A1 | 10/2020 | Maxwell et al. | |
| 2021/0156339 A1 | 5/2021 | Rathay et al. | |
| 2021/0172567 A1 | 6/2021 | Kang et al. | |
| 2021/0180885 A1 | 6/2021 | Wiedenhoefer et al. | |
| 2022/0003503 A1 | 1/2022 | Iyer et al. | |

OTHER PUBLICATIONS

Extended European Search Report for EP Application No. 23164468.3, dated Jul. 20, 2023, 9 pages.
Jiho Kim, et al., "3D printed compact heat exchangers with mathematically defined core structures", from Journal of Computational Design and Engineering, 2020, 24 pages.

(Continued)

*Primary Examiner* — Raheena R Malik
(74) *Attorney, Agent, or Firm* — Kinney & Lange, P.A.

(57) ABSTRACT

A monolithic core for a heat exchanger comprises a plurality of three-dimensional unit cells arranged along three orthogonal axes of the core, the three orthogonal axes comprising a first axis, a second axis, and a third axis. Each of the plurality of unit cells has a first dimension comprising an axial extent along the first axis, a second dimension comprising an axial extent along the second axis, and a third dimension comprising an axial extent along the third axis. For at least one unit cell of the plurality of unit cells, the first dimension is not equal to the second dimension.

20 Claims, 3 Drawing Sheets

(56) References Cited

OTHER PUBLICATIONS

Oraib Al-Ketal, et al., "MSLattice: A free software for generating uniform and graded lattices based on triply periodic minimal surfaces", from Mat. Design Process Comm., 2021, 10 pages.

Oraib Al-Ketal, et al., "Multifunctional mechanical-metamaterials based on triply periodic minimal surface lattices: A review", from <https://www.researchgate.net/publication/334432683>, Jul. 2019, 82 pages.

Oraib Al-Ketal, et al., "Multifunctional mechanical-metamaterials based on triply periodic minimal surface lattices: A review", from Advanced Engineering Materials, 2019, 39 pages.

* cited by examiner

MINIMAL SURFACE CORE HEAT EXCHANGERS WITH THREE-DIMENSIONAL PARAMETRIC CONTROL

BACKGROUND

The present disclosure is related generally to heat exchangers and more particularly to heat exchanger core designs using minimal surfaces.

Traditional engineering designs use straight geometry building blocks to generate complex systems, such as heat exchangers. While this method of design results in ease of manufacturing, it can suffer from low compliance. Low compliance heat exchangers cannot react to the nonlinear thermal gradients without generating mismatched strain and high stresses on the components. A need exists for heat exchangers with increased heat transfer, reduced pressure loss and vibration response, and improved performance under lower thermal stresses.

SUMMARY

A monolithic core for a heat exchanger comprises a plurality of three-dimensional unit cells arranged along three orthogonal axes of the core, the three orthogonal axes comprising a first axis, a second axis, and a third axis. Each of the plurality of unit cells has a first dimension comprising an axial extent along the first axis, a second dimension comprising an axial extent along the second axis, and a third dimension comprising an axial extent along the third axis. For at least one unit cell of the plurality of unit cells, the first dimension is not equal to the second dimension.

A method of forming a heat exchanger core comprises forming, in a layer-by-layer fashion, a plurality of unit cells along three orthogonal axes; the three orthogonal axes comprising a first axis, a second axis, and a third axis. Each of the plurality of unit cells has a first dimension comprising an axial extent along the first axis, a second dimension comprising an axial extent along the second axis, and a third dimension comprising an axial extent along the third axis. For at least one unit cell of the plurality of unit cells, the first dimension is not equal to the second dimension.

Figure 1:
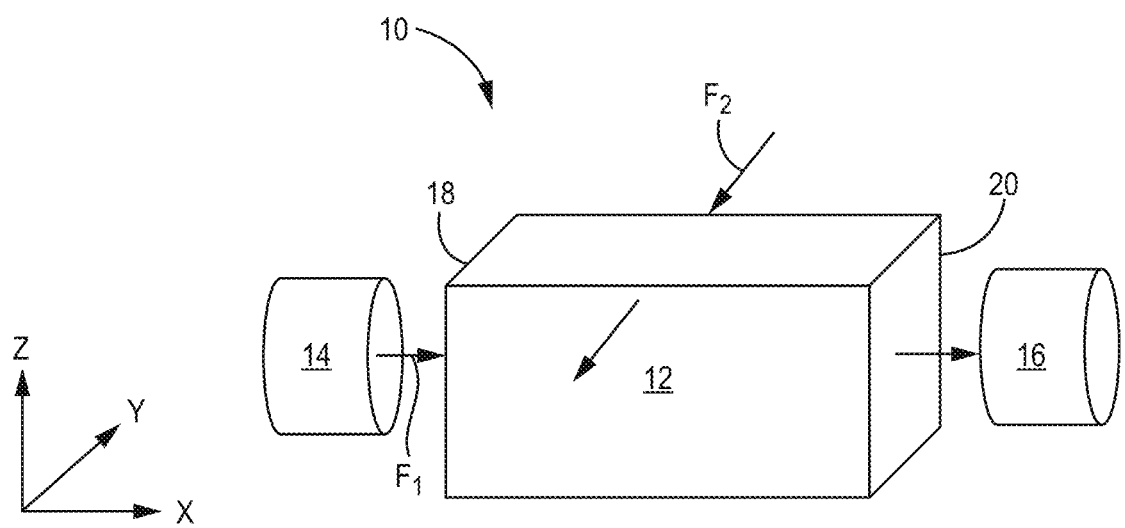
FIG. 1 is a schematic view of a heat exchanger including a core disposed between an inlet and outlet header.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents heat exchanger core arrangements using minimal surfaces. The core includes a three-dimensional stacking arrangement of unit cells. The dimensions of the unit cells can be independently varied along any of the three orthogonal axes without requiring a commensurate scaling along the other axes. This is accomplished by introducing scaling coefficients to the implicit surface approximations.

FIG. 1 is a simplified perspective view of heat exchanger 10. Heat exchanger 10 includes core 12, inlet header 14, and outlet header 16, each being fluidly connected to the others. Inlet header 14 is positioned on inlet side 18 of core 12, and outlet header 16 is positioned on outlet side 20 of core 12. In operation, first fluid $F_1$ flows along the x-axis through inlet header, travels through core 12 from inlet side 18 to outlet side 20, and exits through outlet header 16. In the embodiment shown, heat exchanger 10 has a cross flow arrangement such that second fluid $F_2$ travels through core 12 along the y-axis, generally orthogonal to the flow of fluid $F_1$. In an alternative embodiment, second fluid $F_2$ can flow along the x-axis in an opposite flow direction (i.e., a counter flow arrangement), or in the same flow direction (i.e., a parallel flow arrangement). First fluid $F_1$ can be a relatively hot fluid having a higher temperature than second fluid $F_2$, which can be a relatively cool fluid, but the designations can be reversed in alternative embodiments.

Figure 3:
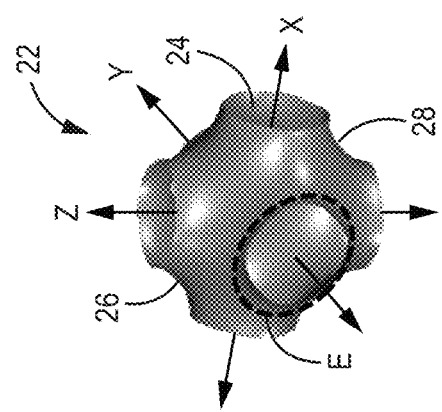
FIG. 3 is a perspective view of a Schwarz P unit cell as tessellated in FIG. 2.
Figure 2:
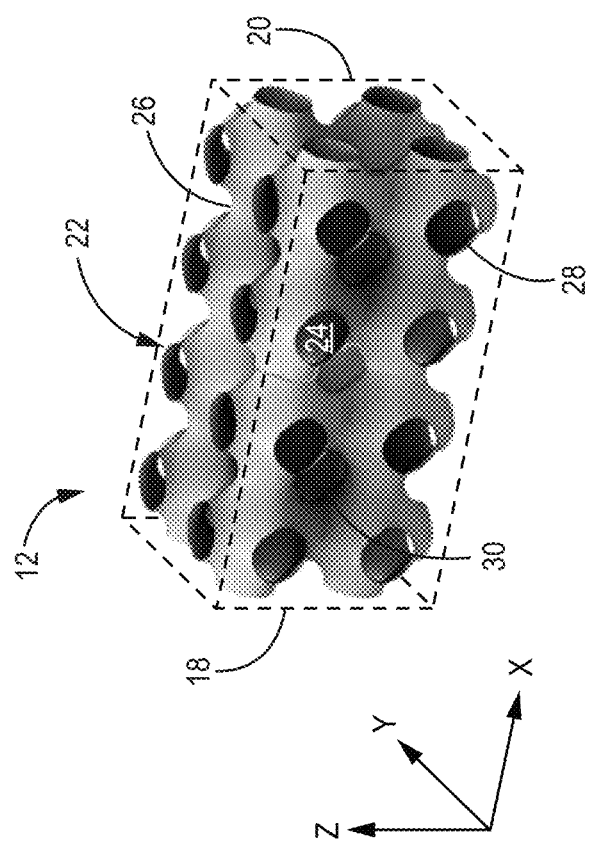
FIG. 2 is a perspective view of one embodiment of the core of the heat exchanger of FIG. 1 as an arrangement of Schwarz P unit cells.

FIG. 2 is a perspective view showing the internal structure of core 12. Core 12 is shown as a monolithic arrangement of triply periodic minimal surface (TPMS) unit cells 22 disposed along three orthogonal axes (i.e., x, y, z). Core 12 can, for example, consist primarily or entirely of a three-dimensional tessellation of unit cells 22. FIG. 3 is a perspective view of an individual unit cell 22. FIGS. 2 and 3 are discussed together.

In the embodiment shown, each unit cell 22 is Schwarz P ("Primitive") minimal surface with two labyrinths, one formed in a first sub-volume defined by inner surface 24 of each unit cell 22, and one formed by a second sub-volume defined by outer surface 26 of each unit cell 22. Accordingly, fluids $F_1$ and/or $F_2$ can flow through the first sub-volume 24 via intra-cell openings 28, and along the second sub-volume via inter-cell openings 30. A standard Schwarz P unit cell can be approximated by the implicit surface: $\cos(x)+\cos(y)+\cos(z)=0$. If such a unit cell were positioned along the x, y, and z-axes, like unit cell 22 of FIG. 3, the extent of the unit cell (i.e., the length between the most distal points along a particular axis) is equal across all three axes. However, unit cells 22 are approximated by the implicit surface with coefficients: $A*\cos(x)+B*\cos(y)+C*\cos(z)=0$, where A, B, and C can be real numbers. The coefficients can further have any of the following relationships: A=B=C, A=B≠C, A≠B=C, A≠B≠C, etc. As such, unit cells 22 and core 12 can be asymmetrical along at least one axis, that is, the extent of an individual unit cell 22 in at least one axial direction is not equal to the other two axial directions.

By way of a first example, core 12 can be elongated in the x-direction (i.e., along the x-axis) using the above coefficient-based approximation for the implicit surface of unit cells 22. Elongation could transform a more circular cross-sectional geometry (e.g., intra or inter-cell openings 28, 30) in the x-z plane to an ellipse, with the major axis disposed in the x-direction. This is represented by dashed line E in FIG. 3. In such a case, a given unit cell 22 can have a greater axial extent in the x-direction. If the relatively hotter fluid $F_1$ is flowing in the x-direction, elongating core 12 in the x-direction can increase the corresponding surface contact area and improve heat transfer. It should be noted that elongation in the x-direction need not influence core 12 in the y or z-directions, as the various aspect ratios of core 12 (i.e., x:y, y:z, x:z) are not fixed. This approach of independently adjusting a single parameter (e.g., elongation in the x-direction) is preferable over an approach using symmetrical scaling, where unit cells 22 would be adjusted (e.g., elongated) in all three axial dimensions. Such symmetrical scaling may not be desirable where spatial and/or weight constraints are a concern, such as in aerospace applications. Similarly, simply increasing the stacking arrangement of unit cells 22 in a particular direction (e.g., the x-direction) may add unnecessary bulk and/or weight to core 12. Although discussed with respect to the adjustment of a single parameter, adjustments to more than one unit cell axial parameters are contemplated herein. This could include, for example, scaled adjustments to two parameters, or independent (i.e., non-scaled) adjustments to two or more parameters. Further, each individual unit cell 22 can be independently adjusted with respect to other unit cells 22 of core 12 in order to provide highly customized designs.

By way of a second example, any of the coefficients can be a coordinate function (e.g., a polynomial expression, sinusoidal function, etc.) to vary the aspect ratios of core 12 in a non-continuous manner. Such coefficients can create a geometry of core 12 for which unit cells 22 midway between inlet end 18 and outlet end 20 are larger, in at least one dimension, than unit cells 22 near inlet end 18 an/or outlet end 20. For example, the larger unit cells 22 might be elongated in the z-direction such that the expansion/contraction of fluid $F_1$ in y-z cross-sections and fluid $F_2$ in x-z cross-sections is favorable for heat transfer augmentation and structural compliance. In another example using functions as coefficients, unit cells 22 near inlet end 18 can be relatively smaller/tighter in at least one direction (e.g., the x-direction), and moving away from inlet end 18 and toward outlet end 20, unit cells 22 can expand/elongate in the x-direction. This arrangement can be implemented to maintain even heat transfer throughout core 12 during operation, because in conventional designs, $\Delta T$ between fluid $F_1$ and $F_2$ tends to be greatest near the inlet end of the hotter fluid (i.e., $F_1$). Thus, by deviating from traditional designs and initially reducing, then gradually increasing surface area in the hot flow direction, it may be possible to maintain higher $\Delta T$ values between the fluids as they move through core 12. This can, accordingly, lead to higher rates of heat transfer within core 12.

Figure 3A:
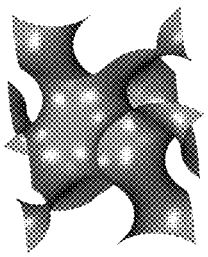
FIGS. 3A-3H illustrate various alternative minimal surface geometries that can be implemented in the heat exchanger core.
Figure 3B:
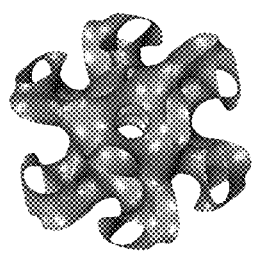
Figure 3C:
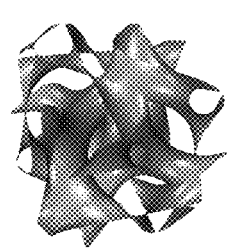
Figure 3D:
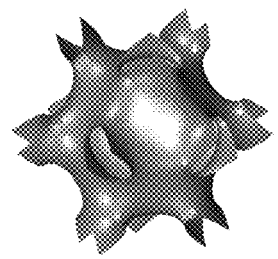
Figure 3E:
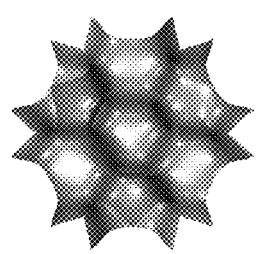
Figure 3F:
Figure 3G:
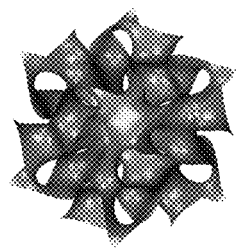
Figure 3H:
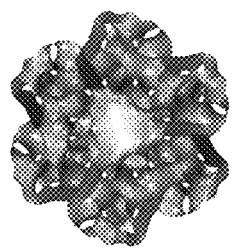

FIGS. 3A-3H illustrate alternative minimal surface unit cell geometries that can be used in other embodiments of core 12. Each can be independently adjusted along one or more axial directions using real number and/or functions as coefficients (i.e., at least one of A, B, C, and D). FIG. 3A shows a gyroid minimal surface which can be approximated by the implicit surface with coefficients: $(A*\cos(x)*\sin(y))+(B*\cos(y)*\sin(z))+(C*\cos(z)*\sin(x))=0$. FIG. 3B shows a derivative gyroid minimal surface which can be approximated by the implicit surface with coefficients: $(A*\sin(2x)*\cos(y)*\sin(z))+(B*\sin(2y)*\cos(z)*\sin(x))+(C*\sin(2z)*\cos(x)*\sin(y))+R=0$. In one example, $R=0.32$. FIG. 3C shows a double gyroid minimal surface which can be approximated by the implicit surface with coefficients: $(2.75 \sin(2x)*\sin(z)*\cos(y))+(\sin(2y)*\sin(x)*\cos(z))+(\sin(2z)*\sin(y)*\cos(x))-(1 \cos(2x)*\cos(2y)+(\cos(2y)*\cos(2z))+(\cos(2z)*\cos(2x))-R=0$. In one example, $R=0.95$. FIG. 3D shows a Neovius minimal surface which can be approximated by the implicit surface with coefficients: $(A*(\cos(x)+\cos(y)+\cos(z)))+(B*\cos(x)*\cos(y)*\cos(z))=0$. FIG. 3E shows a K-Noid minimal surface which can be approximated by the implicit surface with coefficients: $(A*(\cos(x)+\cos(y)+\cos(z)))+(B*(\cos(x)*\cos(y)+\cos(y)*\cos(z)+\cos(z)*\cos(x)))-(C*(\cos(2x)+\cos(2y)+\cos(2z)))+D=0$. FIG. 3F shows a Lidinoid minimal surface which can be approximated by the implicit surface with coefficients: $(A*(\sin(2x)*\cos(y)*\sin(z)+\sin(2y)*\cos(z)*\sin(x)+\sin(2z)*\cos(x)*\sin(y)))$ $(B*(\cos(2x)*\cos(2y)+\cos(2y)*\cos(2z)+\cos(2z)*\cos(2x))+C=0$. FIG. 3G shows a Fischer-Koch S minimal surface which can be approximated by the implicit surface with coefficients: $(A*\cos(2x)*\sin(y)*\cos(z))+(B*\cos(x)*\cos(2y)*\sin(z))+(C*\sin(x)*\cos(y)*\cos(2z)=0$. FIG. 3H shows a Fischer-Koch C(S) minimal surface which can be approximated by the implicit surface with coefficients: $(\cos(2x)+\cos(2y)+\cos(2z))+(2*(\sin(3x)*\sin(2y)*\cos(z))+\cos(x)*\sin(3y)*\sin(2z)+\sin(2x)*\cos(y)*\sin(3z)))+(2*(\sin(2x)*\cos(3y)*\sin(z)+\sin(x)*\sin(2y)*\cos(3z)+\cos(3x)*\sin(y)*\sin(2z)))=0$. Other minimal surfaces according to Schwarz, Schoen, Fischer-Koch, etc. are contemplated herein.

The geometries of FIGS. 3A-3H can be implemented in core 12 in a manner similar to the Schwarz P unit cells 22. These alternative geometries may more be desirable for controlling pressure capabilities of core 12. For example, a Schwarz P unit cell 22 has a higher ratio of volume to surface area than the minimal surfaces of FIGS. 3A-3H. As this ratio decreases for certain geometries, pressure stresses within the core implementing such geometries will also decrease.

Unit cells and core 12 can be formed in a layer-by-layer fashion using a suitable additive manufacturing process. For metal components (e.g., Inconel, aluminum, titanium, etc.), exemplary additive manufacturing processes include but are not limited to powder bed fusion techniques such as powder bed fusion by laser beam (PBF-LB), directed energy deposition by laser beam (DED-LB), and binder jetting (BJT). For polymer or plastic components, stereolithography (SLA) can be used. A polymer core 12 can be implemented, for example, in less extreme operating environments like in an aircraft environmental control system (ECS), where fluid temperatures do not tend to exceed 70° F. (21° C.). Minimal surface topologies are particularly well-suited for additive manufacturing because they are usually self-supporting during the build process.

It is further possible, using an additive manufacturing process, to vary the wall thickness of an individual unit cell 22 and/or groups of unit cells 22. For example, wall thicknesses can be reduced where increased heat transfer is desired, as well as to generally reduce the weight of core 12. Alternatively, wall thicknesses can be increased in regions of higher mechanical and/or thermal stress, such as within unit cells 22 near fluid inlets and/or outlets.

Core 12 is shown with a three-dimensional rectangular geometry based upon the arrangement of unit cells 22, but other tessellated or otherwise repeatable geometries with curves and/or non-right angles are contemplated herein. For example, core 12 might widen or taper from inlet end 18 to outlet end 20 due to adjustments to parameters impacting the z-directional extent of unit cells 22 giving core 12 a trapezoidal geometry. Core 12 could also be "pinched" in a central location giving core a bowtie or hourglass geometry. Further, although shown as a 4×2×2 stacking arrangement in the x, y, and z-axes, respectively, core 12 can include any number of unit cells 22 along any of the axes.

In view of the above, in comparison to conventional cores and to standard minimal surface designs, core 12 is independently manipulable along each orthogonal axis to optimize thermal transfer, pressure capabilities, weight, and spatial constraints, to name a few non-limiting examples. In addition to aerospace applications, the disclosed core can be used generally in other transportation industries, as well as industrial applications.

Discussion of Possible Embodiments

The following are non-exclusive descriptions of possible embodiments of the present invention.

A monolithic core for a heat exchanger comprises a plurality of three-dimensional unit cells arranged along three orthogonal axes of the core, the three orthogonal axes comprising a first axis, a second axis, and a third axis. Each of the plurality of unit cells has a first dimension comprising an axial extent along the first axis, a second dimension comprising an axial extent along the second axis, and a third dimension comprising an axial extent along the third axis. For at least one unit cell of the plurality of unit cells, the first dimension is not equal to the second dimension.

The core of the preceding paragraph can optionally include, additionally and/or alternatively, any one or more of the following features, configurations and/or additional components:

In the above core, the first dimension may not be equal to the third dimension.

In any of the above cores, the second dimension may be equal to the third dimension.

In any of the above cores, the second dimension may not be equal to the third dimension.

In any of the above cores, for each of the plurality of unit cells, the first dimension may not be equal to the second dimension.

In any of the above cores, for a first unit cell of the plurality of unit cells, the first dimension may not be equal to the second dimension, and for a second unit cell of the plurality of unit cells, the first dimension may be equal to the second dimension.

In any of the above cores, for the second unit cell of the plurality of unit cells, the first dimension may not be equal to the third dimension.

In any of the above cores, each of the plurality of unit cells can be a periodic minimal surface selected from the group consisting of Schwarz P, gyroid, gyroid derivative, double gyroid, Neovius, K-Noid, Lidinoid, Fischer-Koch S, Fischer-Koch C(S), and combinations thereof.

In any of the above cores, each of the plurality of unit cells can be formed from a metallic material.

In any of the above cores, each of the plurality of unit cells can be formed from a polymer material.

In any of the above cores, a core geometry includes straight sides at joined at right angles.

In any of the above cores, the core geometry can further include straight sides joined at non-right angles.

In any of the above cores, the core geometry can further include curved sides.

In any of the above cores, a wall thickness of at least one of the plurality of unit cells can vary across the at least one of the plurality of unit cells.

In any of the above cores, a wall thickness of a first subset of the plurality of unit cells can be greater than a wall thickness of a second subset of the plurality of unit cells.

In any of the above cores, the first subset of the plurality of unit cells can be located near a fluid inlet of the core.

A heat exchanger can include any of the above cores, an inlet header at an inlet end of the core and in fluid communication with any of the above cores, and an outlet header at an outlet end of the core and in fluid communication with the inlet header and an of the above cores.

A method of forming a heat exchanger core comprises forming, in a layer-by-layer fashion, a plurality of unit cells along three orthogonal axes; the three orthogonal axes comprising a first axis, a second axis, and a third axis. Each of the plurality of unit cells has a first dimension comprising an axial extent along the first axis, a second dimension comprising an axial extent along the second axis, and a third dimension comprising an axial extent along the third axis. For at least one unit cell of the plurality of unit cells, the first dimension is not equal to the second dimension.

The method of the preceding paragraph can optionally include, additionally and/or alternatively, any one or more of the following features, configurations and/or additional components:

In the above method, the plurality of unit cells can be formed from a metallic material using a powder bed fusion process.

In any of the above methods, the plurality of unit cells can be formed from a polymer material using a stereolithography process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A monolithic core for a heat exchanger, the core comprising:
a plurality of three-dimensional unit cells arranged along three orthogonal axes of the core, the three orthogonal axes comprising a first axis, a second axis, and a third axis;
wherein each of the plurality of unit cells has a first dimension comprising an axial extent along the first axis, a second dimension comprising an axial extent along the second axis, and a third dimension comprising an axial extent along the third axis; and
wherein for a first unit cell of the plurality of unit cells, the first dimension is not equal to the second dimension, and wherein for a second unit cell of the plurality of unit cells, the first dimension is equal to the second dimension.

2. The core of claim 1, wherein for at least one unit cell of the plurality of unit cells, the first dimension is not equal to the third dimension.

3. The core of claim 1, wherein for at least one unit cell of the plurality of unit cells, the second dimension is equal to the third dimension.

4. The core of claim 1, wherein for at least one unit cell of the plurality of unit cells, the second dimension is not equal to the third dimension.

5. The core of claim 1, wherein for at least one unit cell of the plurality of unit cells, the first dimension is not equal to the second dimension.

6. The core of claim 1, wherein for the second unit cell of the plurality of unit cells, the first dimension is not equal to the third dimension.

7. The core of claim 1, wherein each of the plurality of unit cells is a periodic minimal surface selected from the group consisting of Schwarz P, gyroid, gyroid derivative, double gyroid, Neovius, K-Noid, Lidinoid, Fischer-Koch S, Fischer-Koch C(S), and combinations thereof.

8. The core of claim 1, wherein each of the plurality of unit cells is formed from a metallic material.

9. The core of claim 1, wherein each of the plurality of unit cells is formed from a polymer material.

10. The core of claim 1, wherein a core geometry includes straight sides at joined at right angles.

11. The core of claim 10, wherein the core geometry further includes straight sides joined at non-right angles.

12. The core of claim 10, wherein the core geometry further includes curved sides.

13. The core of claim 1, wherein a wall thickness of at least one of the plurality of unit cells varies across the at least one of the plurality of unit cells.

14. The core of claim 1, wherein a wall thickness of a first subset of the plurality of unit cells is greater than a wall thickness of a second subset of the plurality of unit cells.

15. The core of claim 14, wherein the first subset of the plurality of unit cells is located near a fluid inlet of the core.

16. A heat exchanger comprising:
the core of claim 1;
an inlet header at an inlet end of the core and in fluid communication with the core; and
an outlet header at an outlet end of the core and in fluid communication with the inlet header and the core.

17. A method of forming heat exchanger core, the method comprising:
forming, in a layer-by-layer fashion, a plurality of unit cells along three orthogonal axes; the three orthogonal axes comprising a first axis, a second axis, and a third axis;
wherein each of the plurality of unit cells has a first dimension comprising an axial extent along the first axis, a second dimension comprising an axial extent along the second axis, and a third dimension comprising an axial extent along the third axis; and
wherein for a first unit cell of the plurality of unit cells, the first dimension is not equal to the second dimension, and wherein for a second unit cell of the plurality of unit cells, the first dimension is equal to the second dimension.

18. The method of claim 17, wherein the plurality of unit cells are formed from a metallic material using a powder bed fusion process.

19. The method of claim 17, wherein the plurality of unit cells are formed from a polymer material using a stereolithography process.

20. A monolithic core for a heat exchanger, the core comprising:
a plurality of three-dimensional unit cells arranged along three orthogonal axes of the core, the three orthogonal axes comprising a first axis, a second axis, and a third axis;
wherein each of the plurality of unit cells has a first dimension comprising an axial extent along the first axis, a second dimension comprising an axial extent along the second axis, and a third dimension comprising an axial extent along the third axis;
wherein for at least one unit cell of the plurality of unit cells, the first dimension is not equal to the second dimension; and
wherein a wall thickness of a first subset of the plurality of unit cells is greater than a wall thickness of a second subset of the plurality of unit cells.

* * * * *